United States Patent
Chou et al.

(10) Patent No.: US 7,701,711 B2
(45) Date of Patent: Apr. 20, 2010

(54) WATERPROOF PART

(75) Inventors: Chih-Chang Chou, Taipei (TW);
Wan-Yi Lin, Taipei (TW)

(73) Assignee: Inventec Appliances Corp., Taipei (TW)

( * ) Notice: Subject to any disclaimer, the term of this patent is extended or adjusted under 35 U.S.C. 154(b) by 205 days.

(21) Appl. No.: 12/042,971

(22) Filed: Mar. 5, 2008

(65) Prior Publication Data
US 2008/0230430 A1 Sep. 25, 2008

(30) Foreign Application Priority Data
Mar. 22, 2007 (TW) .............................. 96109885 A

(51) Int. Cl.
*G06F 1/16* (2006.01)
(52) U.S. Cl. ................ 361/679.56; 206/811; 455/575.8
(58) Field of Classification Search ................ 206/305, 206/320, 527, 722, 723, 811; 360/93, 132, 360/134–137; 361/679.21, 679.41, 679.55, 361/679.56; 455/90.3, 575.1, 575.8
See application file for complete search history.

(56) References Cited

U.S. PATENT DOCUMENTS

| 4,649,453 | A | * | 3/1987 | Iwasawa | 206/811 |
| 5,914,159 | A | * | 6/1999 | Kato | 206/811 |
| 5,996,790 | A | * | 12/1999 | Yamada et al. | 206/811 |
| 6,659,274 | B2 | * | 12/2003 | Enners | 206/305 |
| 2004/0089570 | A1 | * | 5/2004 | Chien et al. | 206/320 |
| 2007/0109730 | A1 | * | 5/2007 | Shigyo et al. | 361/600 |

* cited by examiner

*Primary Examiner*—Luan K Bui
(74) *Attorney, Agent, or Firm*—J.C. Patents

(57) ABSTRACT

A waterproof part including a top case, a bottom case and at least one pin is provided. The top case has at least one first through hole. The bottom case has at least one second through hole that corresponds to the first through hole. The pin includes a conductive bolt, a pad, and an elastic conductive component. The conductive bolt is disposed in the second through hole and fastened to the bottom case. The pad is disposed in the first through hole and has at least one first fastening element. The pad is fastened to the top case by the first fastening element. The elastic conductive component is tightly disposed between the conductive bolt and the pad so as to connect to the conductive bolt and the pad electrically.

9 Claims, 2 Drawing Sheets

WATERPROOF PART

CROSS-REFERENCE TO RELATED APPLICATION

This application claims the priority benefit of Taiwan application serial no. 96109885, filed on Mar. 22, 2007. The entirety of the above-mentioned patent application is hereby incorporated by reference herein and made a part of this specification.

BACKGROUND OF THE INVENTION

1. Field of the Invention

The present invention generally relates to a waterproof part, more particularly, to a waterproof part having at least one pin.

2. Description of Related Art

With rapid advance in technologies, many types of handheld electronic devices such as mobile phone, personal digital assistant (PDA), digital camera, digital recorder and MP3 player have been developed. As a result, modern day people not only are able to communicate with one another at any time and anywhere, but the process of making video recording also provides them with a lot of fun.

Most of the earlier handheld electronic devices are not designed with the waterproof function. Therefore, when a user uses the handheld electronic device in a rainy day or water is accidentally spilled on the handheld electronic device, water may seep into the internal circuit through the pins of the handheld electronic device. Consequently, the internal circuit may be damaged and the handheld electronic device may malfunction. In this way, the environment and the range of operation of the handheld electronic device by the user is severely restricted. To remove these restrictions, waterproof part suitable for protecting a handheld electronic device has been developed.

FIG. 1 is a schematic cross-sectional view of a convention waterproof part. As shown in FIG. 1, the waterproof part 100 can be applied to handheld electronic devices such as mobile phones, personal digital assistants and digital cameras. The waterproof part 100 includes a cover 110, a case 120, a plurality of pins 130 and a waterproof rubber 140. The cover 110 has a plurality of through holes 112 that corresponds to the pins 130, and the pins 130 are fastened to the case 120. Furthermore, a waterproof ring 122 surrounds the pins 130.

The waterproof rubber 140 is disposed between the cover 110 and the waterproof ring 122, and the pins 130 pass through the waterproof rubber 140 via a plurality of through holes 142 in the waterproof rubber 140. The cover 110 and the waterproof ring 122 clamp the waterproof rubber 140 tightly so that the waterproof part 100 is able to prevent water seeping into the interior of the handheld electronic device through any gap between the waterproof rubber 140, the cover 110 and the waterproof ring 122 (the area marked X in FIG. 1).

However, the slits S1 between the pins 130 and the cover 110 and the slits S2 between the pins 130 and the waterproof rubber 140 still allow some water to leak into the internal circuit of the handheld electronic device. Therefore, the internal circuit may be damaged and the handheld electronic device may malfunction.

SUMMARY OF THE INVENTION

Accordingly, the present invention provides a waterproof part applicable to a handheld electronic device for preventing water leaking into the internal circuit of the handheld electronic device.

According to an embodiment of the present invention, a waterproof part including a top case, a bottom case and at least one pin is provided. The top case has at least one first through hole. The bottom case has at least one second through hole that corresponds to the first through hole. The pin includes a conductive bolt, a pad, and an elastic conductive component. The conductive bolt is disposed in the second through hole and fastened to the bottom case. The pad is disposed in the first through hole and has at least one first fastening element. The pad is fastened to the top case by the first fastening element. The elastic conductive component is tightly disposed between the conductive bolt and the pad so as to connect to the conductive bolt and the pad electrically.

In an embodiment of the present invention, the waterproof part further includes an adhesive disposed near the edge of the top case for connecting the top case to the bottom case.

In an embodiment of the present invention, the adhesive is double-sided adhesive tape.

In an embodiment of the present invention, the first fastening element is a flange.

In an embodiment of the present invention, the conductive bolt has a sidewall and at least one second fastening element disposed on the sidewall. The conductive bolt is fastened to the bottom case by the second fastening element.

In an embodiment of the present invention, the second fastening element is a flange.

In an embodiment of the present invention, the conductive bolt further includes a plurality of second fastening elements, and the conductive bolt is fastened to the bottom case by the second fastening elements.

In an embodiment of the present invention, the elastic conductive component is disposed in the first through hole.

In an embodiment of the present invention, the elastic conductive component is a conductive rubber.

In an embodiment of the present invention, the waterproof part further includes a plurality of pins. The top case has a plurality of first through holes and the bottom case has a plurality of second through holes. The pads of the pins are respectively disposed in the first through holes, and the conductive bolts of the pins are respectively disposed in the second through holes.

The present invention prevents water leaking from the first through hole into the bottom case through the first fastening element of the pad and the elastic conductive component. Therefore, the waterproof part of the present invention can prevent water from seeping into the interior of the handheld electronic device to cause a malfunction.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
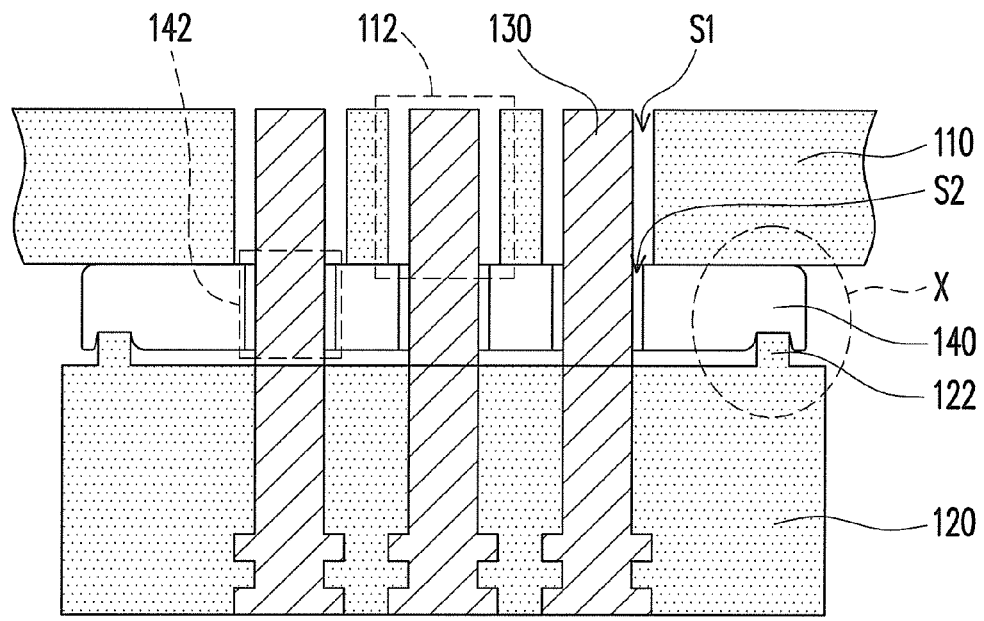
FIG. 1 is a schematic cross-sectional view of a convention waterproof part.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
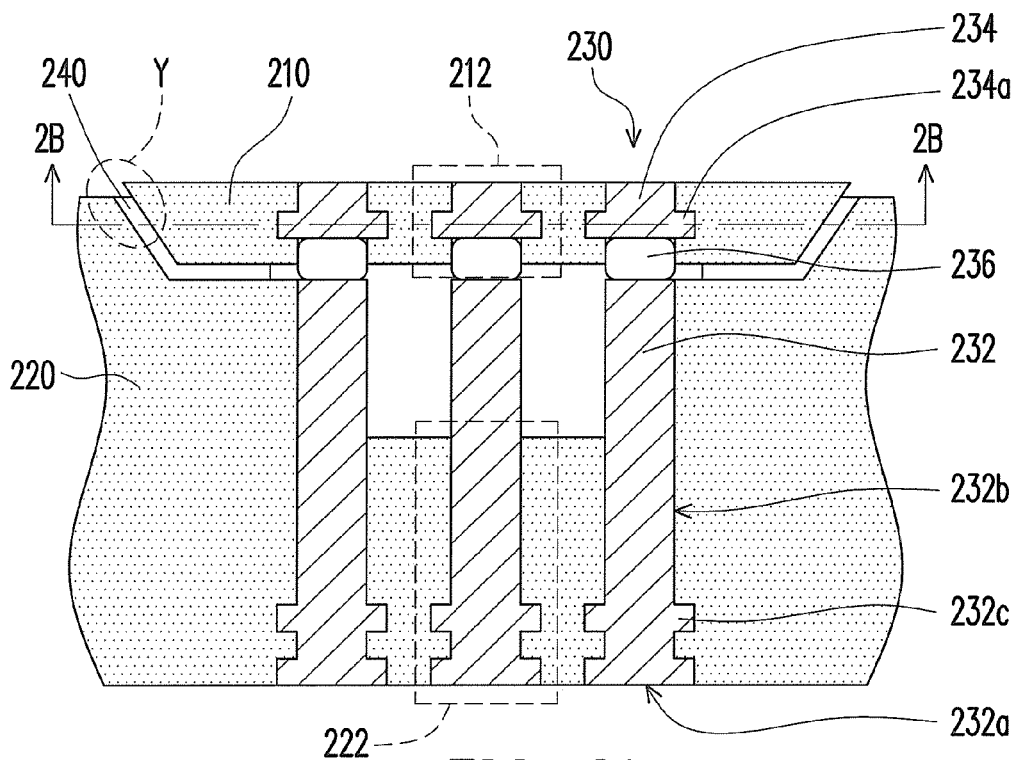
FIG. 2A is a schematic cross-sectional view of a waterproof part according to an embodiment of the present invention.

FIG. 2A is a schematic cross-sectional view of a waterproof part according to an embodiment of the present invention. As shown in FIG. 2A, the waterproof part 200 includes a top case 210, a bottom case 220 and a plurality of pins 230. The top case 210 has a plurality of first through holes 212, and the bottom case 220 has a plurality of second through holes 222 that corresponds to the first through holes 212.

Each pin 230 includes a conductive bolt 232, a pad 234 and an elastic conductive component 236. The conductive bolts 232 are respectively disposed in the second through holes 222, and the conductive bolts 232 are fastened to the bottom case 220. The pads 234 are respectively disposed in the first through holes 212, and each pad 234 has a first fastening element 234a. Each pad 234 is fastened to the top case 210 by the first fastening element 234a.

Although each pad 234 has a first fastening element 234a in FIG. 2A, each pad 234 can have two or more first fastening elements 234a and can be fastened to the top case 210 by the first fastening elements 234a. Therefore, the number of first fastening elements 234a in each pad 234 shown in FIG. 2A is used as an illustration only and should not be used to limit the present invention.

Moreover, the top case 210 and the bottom case 220 in the present embodiment can be fabricated by using a buried ejection method. As a result, the pads 234 and the conductive bolts 232 are tightly disposed in the first through holes 212 of the top case 210 and in the second through holes 222 of the bottom case 220.

For the same pin 230, the elastic conductive component 236 is tightly disposed between the conductive bolt 232 and the pad 234 so as to connect to the conductive bolt 232 and the pad 234 electrically. In the present embodiment, the elastic conductive components 236 can be disposed in the first through holes 212. Hence, the elastic conductive components 236 are fixed in the top case 210. In addition, each of the elastic conductive components 236 can be a conductive rubber.

The pads 234 can be electrically connected to an external electronic device or battery, and the bottom end 232a of the conductive bolts 232 can be electrically connected to an electronic device or circuit board inside a handheld electronic device (not shown). Because the elastic conductive component 236 is electrically connected to the conductive bolt 232 and the pad 234, the external electronic device or battery can be electrically connected to the electronic device or circuit board inside the handheld electronic device by the pad 234.

Figure 2B:
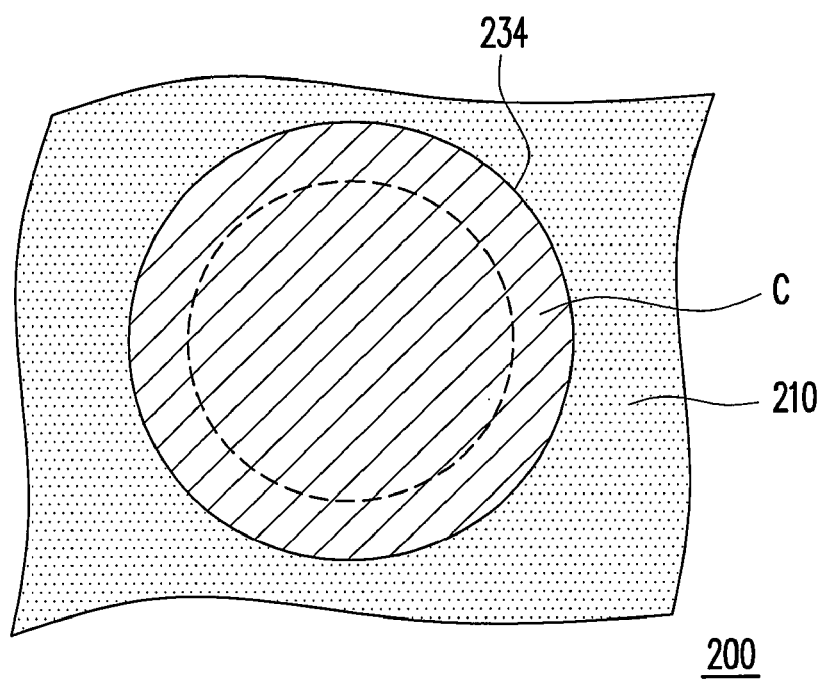
FIG. 2B is a cross-sectional view along line I-I of FIG. 2A.

Because the pads 234 are fastened to the top case 210 through the first fastening element 234a, slits that causes the leakage of water between the top case 210 and the pads 234 can hardly form and each first fastening element 232a can form a barrier blocking water leak. More specifically, even if some water seeps into the slits between the top case 210 and the pads 234, the barrier formed by each first fastening element 234a can still stop the water from seeping further into the elastic conductive component 236 and the conductive bolt 232. Therefore, the waterproof part 200 is able to provide the handheld electronic device with a waterproof function and prevent the handheld electronic device from malfunctioning due to water seepage. Additionally, each first fastening element 234a in the present embodiment can be a flange C, as shown in FIG. 2B.

In addition, the waterproof part 200 may further include an adhesive 240 disposed near the edge of the top case 210. In the present embodiment, the adhesive 240 can be double-sided adhesive tape or other adhesive with good adhesion. The adhesive 240 connects the top case 210 and the bottom case 220. In other words, the adhesive 240 adheres to the top case 210 and the bottom case 220 (the area marked Y in FIG. 2A). Thus, water is prevented from seeping into the elastic conductive component 236 and the conductive bolt 232 through the gap between the top case 210 and the bottom case 220 to cause a malfunction of the handheld electronic device.

In the present embodiment, each conductive bolt 232 can have a sidewall 232b and a plurality of second fastening elements 232c disposed on the sidewall 232b. Each conductive bolt 232 can be fastened to the bottom case 220 by the second fastening elements 232c. In addition, each second fastening element 232c can be a flange.

It should be noted that three pins 230 are shown in FIG. 2A. However, in other embodiments, the number of pins can be one, two or more than three. Moreover, the number of first through holes 212 corresponding to the pins 230 and the number of second through holes 222 corresponding to the first through holes 212 can be one, two or more than three. Therefore, it should be stressed that the number of pins 230, the first through holes 212 and the second through holes 222 in FIG. 2A is used only as an example and should not be used to limit the present invention.

In summary, the present invention utilizes the first fastening elements to prevent water from seeping into the interior of the handheld electronic device so as to prevent possible damage to the interior circuit and result in a malfunction. Moreover, the elastic conductive component is electrically connected to the pad and the conductive bolt so that an external device or battery can be electrically connected to the handheld electronic device through the pad.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A waterproof part, comprising:
   a top case, having at least one first through hole;
   a bottom case, having at least one second through hole corresponding to the first through hole;
   at least one pin, comprising:
      a conductive bolt, disposed in the second through hole, and fastened to the bottom case;
      a pad, disposed in the first through hole, wherein the pad has at least one first fastening element, and the pad is fastened to the top case by the first fastening element; and
      an elastic conductive component, tightly disposed between the conductive bolt and the pad for electrically connecting the conductive bolt and the pad.

2. The waterproof part according to claim 1, further comprising an adhesive disposed near an edge of the top case, wherein the adhesive connects the top case and the bottom case.

3. The waterproof part according to claim 2, wherein the adhesive is double-sided adhesive tape.

4. The waterproof part according to claim 1, wherein the first fastening element is a flange.

5. The waterproof part according to claim 1, wherein the conductive bolt has a sidewall and at least one second fastening element is disposed on the sidewall, and the conductive bolt is fastened to the bottom case by the second fastening element.

6. The waterproof part according to claim 5, wherein the second fastening element is a flange.

7. The waterproof part according to claim 1, wherein the elastic conductive component is disposed inside the first through hole.

8. The waterproof part according to claim 1, wherein the elastic conductive component is a conductive rubber.

9. The waterproof part according to claim 1, wherein, when the waterproof part has a plurality of pins, the top case has a plurality of corresponding first through holes, the bottom case has a plurality of corresponding second through holes, and pads of the pins are respectively disposed in the first through holes, and conductive bolts of the pins are disposed in the second through holes, respectively.

* * * * *